(12) United States Patent
Nakagawa et al.

(10) Patent No.: US 9,683,839 B2
(45) Date of Patent: Jun. 20, 2017

(54) METHOD OF CORRECTING MEASUREMENT ERROR OF SHAPE MEASURING APPARATUS, AND SHAPE MEASURING APPARATUS

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 158 days.

(21) Appl. No.: 14/732,056

(22) Filed: Jun. 5, 2015

(65) Prior Publication Data
US 2016/0018218 A1  Jan. 21, 2016

(30) Foreign Application Priority Data

Jul. 18, 2014 (JP) .................................. 2014-148333

(51) Int. Cl.
*G01B 21/04* (2006.01)
*G01B 5/008* (2006.01)

(52) U.S. Cl.
CPC ........... *G01B 21/045* (2013.01); *G01B 5/008* (2013.01)

(58) Field of Classification Search
CPC .............................. G01B 21/045; G01B 5/008
USPC ........................................................... 33/503
See application file for complete search history.

(56) References Cited

U.S. PATENT DOCUMENTS

| 4,603,487 A * | 8/1986 | Matsunata | G01B 7/28 33/501.9 |
| 6,758,085 B2 * | 7/2004 | Nagaike | G01B 3/008 33/503 |
| 7,246,448 B2 * | 7/2007 | Lotze | G01B 21/045 33/559 |

(Continued)

FOREIGN PATENT DOCUMENTS

| EP | 2703775 | 3/2014 |
| JP | 2008-101991 | 5/2008 |

(Continued)

OTHER PUBLICATIONS

Search Report issued by E.P.O. patent office in E.P.O. Patent Application No. 15174304.4, dated Dec. 15, 2015.

*Primary Examiner* — Christopher Fulton
(74) *Attorney, Agent, or Firm* — Greenblum & Bernstein, P.L.C.

(57) ABSTRACT

In a shape measuring apparatus having a scanning probe to perform scanning measurement using a tip ball provided at an end of a stylus with the tip ball being in contact with an object to be measured, a tip ball displacement detector detects a displacement of the tip ball of the scanning probe, a displacement of a moving mechanism that relatively moves the object to be measured and the scanning probe is detected, and an angle formed by a contact direction of the tip ball with the object to be measured and an axial direction of the stylus is calculated. The displacement of the tip ball that is detected by the tip ball displacement detector is corrected on the basis of the angle, and a corrected value of the displacement is outputted. The corrected value is added to the displacement of the moving mechanism to calculate a measurement value.

14 Claims, 13 Drawing Sheets

(56) References Cited

U.S. PATENT DOCUMENTS

| | | | |
|---|---|---|---|
| 7,464,481 B2 * | 12/2008 | Ishikawa | G01B 5/008 |
| | | | 33/503 |
| 7,660,688 B2 * | 2/2010 | Ishikawa | G01B 21/045 |
| | | | 33/503 |
| 7,900,367 B2 * | 3/2011 | Sutherland | G01B 21/042 |
| | | | 33/502 |
| 9,091,522 B2 | 7/2015 | Nakagawa et al. | |
| 9,097,504 B2 | 8/2015 | Ishikawa et al. | |
| 9,298,178 B2 * | 3/2016 | Noda | G01B 21/04 |
| 9,341,459 B2 * | 5/2016 | Noda | G01B 21/047 |
| 9,464,877 B2 * | 10/2016 | Nakagawa | G01B 5/008 |
| 2016/0131470 A1 * | 5/2016 | Ishikawa | G01B 21/045 |
| | | | 33/503 |
| 2016/0195389 A1 * | 7/2016 | Sagemueller | G05B 19/401 |
| | | | 33/503 |

FOREIGN PATENT DOCUMENTS

| | | |
|---|---|---|
| JP | 5221004 B | 6/2013 |
| JP | 2014-66693 | 4/2014 |
| JP | 2014-98610 | 5/2014 |

\* cited by examiner

METHOD OF CORRECTING MEASUREMENT ERROR OF SHAPE MEASURING APPARATUS, AND SHAPE MEASURING APPARATUS

CROSS-REFERENCE TO RELATED APPLICATION

The disclosure of Japanese Patent Application No. 2014-148333 filed on Jul. 18, 2014 including specifications, drawings and claims is incorporated herein by reference in its entirety.

TECHNICAL FIELD

The present invention relates to a method of correcting a measurement error of a shape measuring apparatus, and a shape measuring apparatus. In particular, the present invention relates to a method of correcting a measurement error of a shape measuring apparatus when performing scanning measurement by means of the shape measuring apparatus provided with a scanning probe, which is suitably used in a three-dimensional coordinate measuring machine (also simply called three-dimensional measuring machine), and also relates to a shape measuring apparatus.

BACKGROUND ART

At present, to examine the processing accuracy and the like of a three-dimensional product, shape measuring apparatuses having a three-dimensional measuring machine 1 as shown in FIG. 1 and the like are used. Such a three-dimensional measuring machine 1 measures the shape of a product A by, for example, moving a tip ball 14 of a stylus 12 of a scanning probe 10 along the three-dimensional shape of the product A. In the drawing, a reference numeral 2 refers to a column. A reference numeral 3 refers to a movable table. A reference numeral 4 refers to a base. A reference numeral 5 refers to a support frame. A reference numeral 6 refers to a brace. A reference numeral 7 refers to a beam. A reference numeral 8 refers to a slider.

When the three-dimensional measurement machine 1 performs measurement using the scanning probe 10, a measurement error occurs by the effect of the operation of the slider 8 to which the scanning probe 10 is attached. For example, in measuring a circle by the scanning probe 10, a motion error called a quadrant projection occurs. The quadrant projection is a motion error formed into a projection at the time of mechanically switching quadrants (at the time of reversing a movement direction of each axis) in rectangular coordinates of the three-dimensional measuring machine 1, when the tip ball 14 of the stylus 12 of the scanning probe 10 is in circular motion. This quadrant projection is mainly caused by a backlash and the like owing to the mechanical structure of the three-dimensional measuring machine 1.

FIG. 3 shows an example of a result of scanning measurement of an arc C of a sphere B, being an object to be measured, in a stylus position as shown in FIG. 2. A measurement error due to the quadrant projection at the time of switching from a fourth quadrant to a first quadrant is especially prominent. This is an error caused by the quadrant projection produced by a backlash and the like in reversing movement of the scanning probe 10.

On the other hand, Japanese Patent No. 5221004 (hereinafter called Patent Literature 1) describes an example of a correction method of the measurement error occurring in measurement using the scanning probe 10. According to this method, the position of a slider tip at an end of the slider is estimated with the use of a correction filter based on a frequency transfer characteristic between a scale unit for detecting a displacement of the slider and the slider tip. Then, a measurement value is calculated by adding an estimated value to a scanning probe detection value, so that the measurement error owing to the quadrant projection can be corrected.

Japanese Patent Application Laid-Open No. 2014-66693 (hereinafter called Patent Literature 2) and Japanese Patent Application Laid-Open No. 2014-98610 (hereinafter called Patent Literature 3) also describe correction methods of the measurement error owing to the quadrant projection.

SUMMARY OF INVENTION

Technical Problem

However, in the scanning measurement of the arc C, an angle formed by an axial direction of the stylus 12 and contact direction with the sphere B varies, and hence deformation directions of the scanning probe 10 and the stylus 12 are changed during the scanning measurement. For example, as shown in FIG. 4, the deformation directions of the scanning probe 10 and the stylus 12 are perpendicular to an axis of the stylus 12 in the case of I, and coincides with the axial direction of the stylus 12 in the case of II. Since the stiffness of a stylus axis is different between the cases of I and II, a frequency transfer characteristic in the case of I from the tip ball 14 of the scanning probe 10 to a tip ball displacement detector 11 and a frequency transfer characteristic in the case of II from the tip ball 14 of the scanning probe 10 to a tip ball displacement detector 11 are also different. In other words, since the stiffness of the stylus axis varies in accordance with the angle formed by the axial direction of the stylus 12 and the contact direction with the sphere B during the scanning measurement of the arc C, the frequency transfer characteristic from the tip ball 14 of the scanning probe 10 to the tip ball displacement detector 11 also varies.

However, the measurement methods described in the patent Literatures 1 to 3 do not consider the fact that the frequency transfer characteristic from the tip ball 14 of the scanning probe 10 to the tip ball displacement detector 11 varies depending on the angle formed by the axial direction of the stylus 12 and the contact direction with the object to be measured (sphere B). Thus, when the angle formed by the axial direction of the stylus and the contact direction with the object to be measured varies during the scanning measurement from a value at the time of obtaining a correction parameter, the measurement error owing to the quadrant projection may not be corrected in an appropriate manner as shown in FIG. 5 as an example.

The present invention has been made to solve the above-described problem in association with the conventional technique, and an object thereof is to correct the measurement error owing to the quadrant projection in an appropriate manner irrespective of the angle formed by the axial direction of the stylus and the contact direction with the object to be measured.

Solution to Problem

In order to solve the above-described problem, according to the present invention, in a method of correcting measurement error of a shape measuring apparatus, the shape measuring apparatus having a scanning probe for performing scanning measurement using a tip ball that is provided at an end of a stylus and is brought into contact with an object to be measured, included are the step of detecting a displacement of the tip ball of the scanning probe by a tip ball displacement detector, the step of detecting a displacement of a moving mechanism for relatively moving the object to be measured and the scanning probe, the step of calculating an angle formed by a contact direction of the tip ball with the object to be measured and an axial direction of the stylus, the step of correcting, on the basis of the angle, the displacement of the tip ball that is detected by the tip ball displacement detector and outputting a corrected value of the displacement, and the step of adding the corrected value and the displacement of the moving mechanism to calculate a measurement value.

Here, the step of correcting, on the basis of the angle, the displacement of the tip ball that is detected by the tip ball displacement detector and outputting a corrected value of the displacement may include the step of calculating a sinusoidal value of the angle, the step of correcting the displacement of the tip ball, which is detected by the tip ball displacement detector, on the basis of the inverse of a frequency transfer characteristic from the tip ball to the tip ball displacement detector, and the step of adding a product of the corrected displacement and the sinusoidal value to a product of a subtracted value of the sinusoidal value from 1 and the displacement of the tip ball, and outputting a result of the addition as the corrected value.

The inverse of the frequency transfer characteristic may be an estimated value.

The inverse of the frequency transfer characteristic may be estimated by experiment.

A displacement generation mechanism for displacing the tip ball and a displacement sensor for measuring a displacement of the displacement generation mechanism may be used, so that the displacement generation mechanism is caused to generate a periodic displacement and both of the tip ball displacement detector and the displacement sensor actually measure the displacement. An amplitude and a phase of an output of the displacement sensor, with respect to an amplitude and a phase of a scanning probe detection value detected by the tip ball displacement detector, are calculated. The above-described processes are repeated while a frequency of the periodic displacement generated by the displacement generation mechanism is changed to obtain an actual measurement value of the inverse of the frequency transfer characteristic, whereby the estimated value of the frequency transfer characteristic is obtained.

The inverse of the frequency transfer characteristic may be estimated by a theory using a physical model of the scanning probe.

The step of performing filtering processing to remove an unnecessary frequency component from the corrected displacement or the measurement value may be further included.

The present invention provides a shape measuring apparatus having a scanning probe for performing scanning measurement using a tip ball that is provided at an end of a stylus and is brought into contact with an object to be measured. The shape measuring apparatus is characterized by including a tip ball displacement detector for detecting a displacement of the tip ball of the scanning probe, a scale unit for detecting a displacement of a moving mechanism for relatively moving the object to be measured and the scanning probe, means for calculating an angle formed by a contact direction of the tip ball with the object to be measured and an axial direction of the stylus, means for correcting, on the basis of the angle, the displacement of the tip ball that is detected by the tip ball displacement detector and outputting a corrected value of the displacement, and means for adding the corrected value and the displacement of the moving mechanism detected by the scale unit to calculate a measurement value.

The means for correcting, on the basis of the angle, the displacement of the tip ball that is detected by the tip ball displacement detector and outputting a corrected value of the displacement may include means for calculating a sinusoidal value of the angle, means for correcting the displacement of the tip ball, which is detected by the tip ball displacement detector, on the basis of an inverse of a frequency transfer characteristic from the tip ball to the tip ball displacement detector, and means for adding a product of the corrected displacement and the sinusoidal value to a product of a subtracted value of the sinusoidal value from 1 and the displacement of the tip ball, and outputting a result of the addition as the corrected value.

The inverse of the frequency transfer characteristic may be an estimated value.

The inverse of the frequency transfer characteristic may be estimated by experiment.

The shape measuring apparatus may be provided with a displacement generation mechanism for displacing the tip ball and a displacement sensor for measuring a displacement of the displacement generation mechanism, and configured such that the displacement generation mechanism is caused to generate a periodic displacement and both of the tip ball displacement detector and the displacement sensor actually measure the displacement; an amplitude and a phase of an output of the displacement sensor, with respect to an amplitude and a phase of a scanning probe detection value detected by the tip ball displacement detector, are calculated; and the above-described processes are repeated while a frequency of the periodic displacement generated by the displacement generation mechanism is changed to obtain an actual measurement value of the inverse of the frequency transfer characteristic, whereby the estimated value of the frequency transfer characteristic is obtained.

The inverse of the frequency transfer characteristic may be estimated by a theory using a physical model of the scanning probe.

Also, a filter for performing filtering processing to remove an unnecessary frequency component from the corrected displacement or the measurement value may be provided.

Advantageous Effects of Invention

According to the present invention, the angle formed by the axial direction of the stylus and the contact direction with the object to be measured is obtained, and a correction amount is calculated with the use of the angle. Therefore, it is possible to correct the measurement error owing to the quadrant projection in an appropriate manner irrespective of the angle formed by the axial direction of the stylus and the contact direction with the object to be measured, and improve measurement accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings. Note that, the present invention is not limited to descriptions of the below embodiments and practical examples. Components of the embodiments and the practical examples described below contain what is easily assumed by those skilled in the art, what is substantially the same, and what is in a so-called equivalent scope. Moreover, the components disclosed in the embodiments and the practical examples described below may be appropriately combined with each other or appropriately selectively used.

Figure 1:
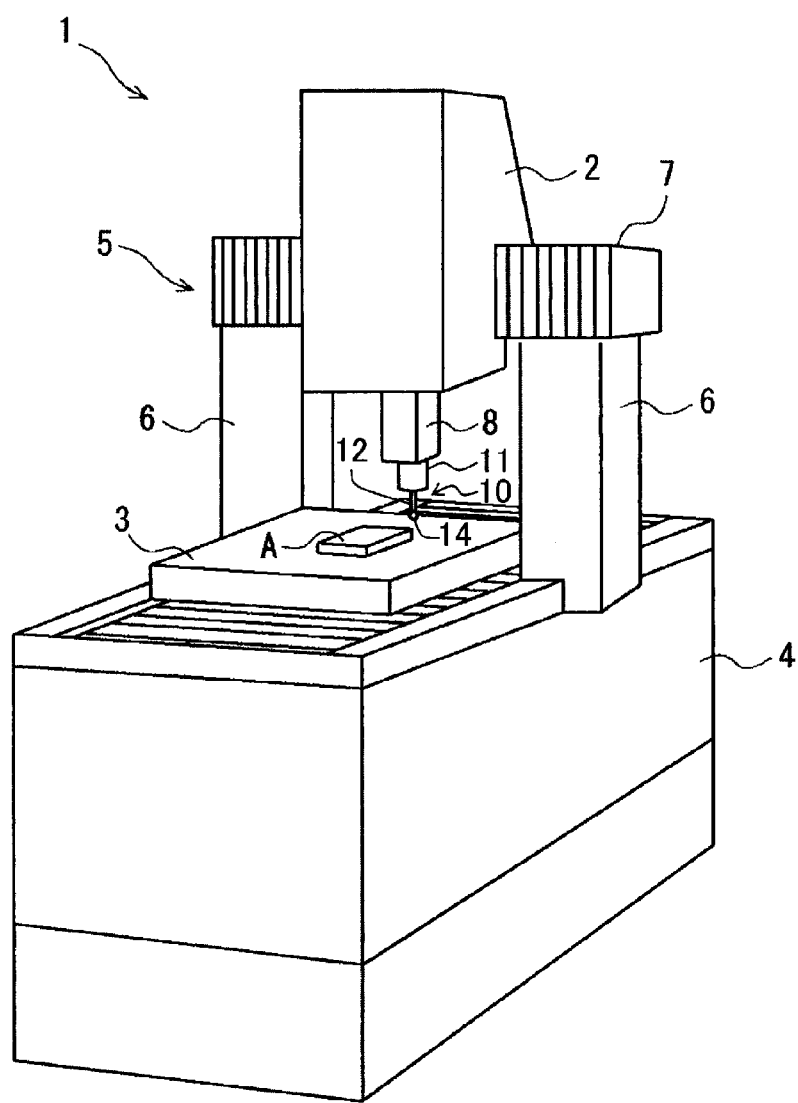
FIG. 1 is a perspective view of a three-dimensional measuring machine.
Figure 6:
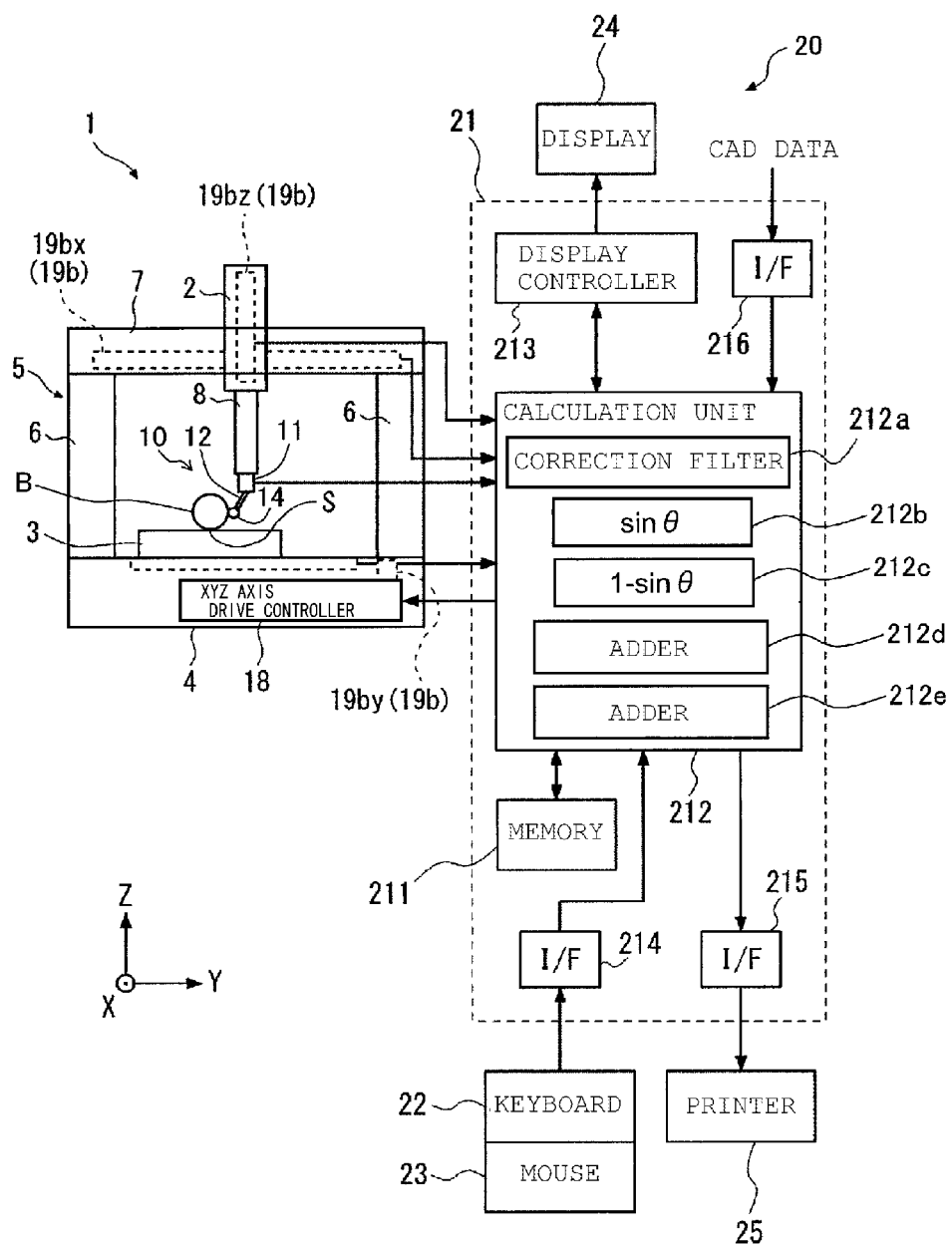
FIG. 6 is a front view, partly including a block diagram, showing the entire configuration of an embodiment of the present invention.

As shown in FIGS. 1 and 6, a shape measuring apparatus includes a three-dimensional measuring machine 1 and a computer 20 that are connected to each other through a not-shown cable.

The three-dimensional measuring machine 1 is provided with a base 4 installed on a floor or the like, and a support frame 5 in the shape of a gate erected on the base 4. The base 4 has a movable table 3 that is movable in a Y axial direction. The support frame 5 has a pair of braces 6 fixed on the base 4 and a beam 7 extending across the braces 6. The beam 7 is provided with a column 2 that is movable in an X axial direction along the beam 7 and extends in a vertical direction. To the column 2, a slider 8 that moves up and down in the vertical direction (Z axial direction) is attached.

The movable table 3 is driven in the Y axial direction by a servomotor of a Y axis driving mechanism (not shown) extending in the Y axial direction. The column 2 is driven in the X axial direction by a servomotor of an X axis driving mechanism (not shown) extending in the X axial direction. The slider 8 is driven in the Z axial direction by a servomotor of a Z axis driving mechanism (not shown) extending in the Z axial direction. Each servomotor is controlled by a pulse signal outputted from an XYZ axes drive controller 18.

The three-dimensional measuring machine 1 has a scale unit 19b for measuring a movement amount in each of the X axial, Y axial, and Z axial directions. The scale unit 19b is constituted by a Y axis scale portion 19by for measuring a movement amount (displacement) of the movable table 3 in the Y axial direction, an X axis scale portion 19bx for measuring a movement amount of the column 2 in the X axial direction, and a Z axis scale portion 19bz for measuring a movement amount of the slider 8 in the Z axial direction.

Figure 2:
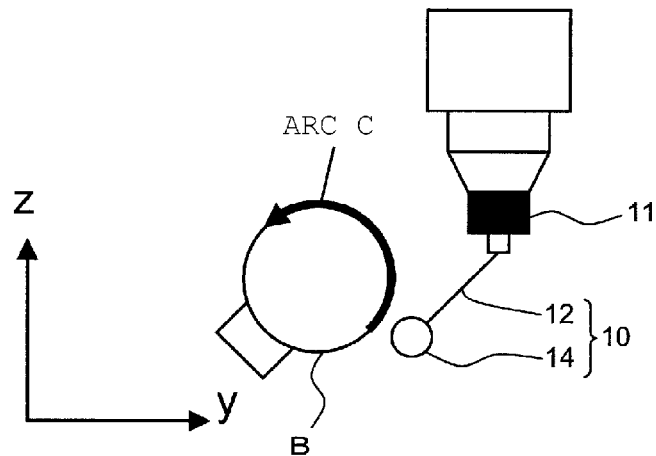
FIG. 2 is a front view showing the state of performing scanning measurement of a sphere.

A scanning probe 10 is attached to a tip end (bottom end in FIG. 2) of the slider 8. The scanning probe 10 has a tip ball displacement detector 11 fixed to the bottom end of the slider 8, and a stylus 12 the proximal end of which is detachably attached to the tip ball displacement detector 11. The stylus 12 is provided with a tip ball 14 at its tip end that is brought into contact with an object to be measured (sphere B in the drawing) disposed on a top surface of the movable table 3.

The stylus 12 is detachably attached to the tip ball displacement detector 11 with a screw or the like, and exchangeable as necessary. In measurement, the object to be measured (B) is fixed with a jig on an object mount S that is in the top surface of the movable table 3 and the object to be measured (B) is supposed to be mounted on the object mount S.

The tip ball 14 is in contact with the object to be measured (B) fixed on the object mount S, which is located in the center of the movable table 3, in a state of being displaced by a predetermined shift amount from a reference position (the center position). The tip ball displacement detector 11 contained in the scanning probe 10 outputs shift amounts in each of the X axial, Y axial, and Z axial directions from the reference position to deliver them to the computer 20.

The computer 20 receives necessary measurement values by controlling drive of the three-dimensional measuring machine 1, and performs necessary arithmetic processing to calculate the surface shape of the object to be measured (B). The computer 20 has a computer main body 21, a keyboard 22, a mouse 23, a display 24 formed from, for example, a liquid crystal display device or a CRT, and a printer 25. As for the keyboard 22, the mouse 23, the display 24, and the printer 25, products for general purpose use are available, and thus the detailed description thereof will be omitted. The details of the computer main body 21 will be described later.

The three-dimensional measuring machine 1 controls the movement of the scanning probe 10 in each of the X axial, Y axial, and Z axial directions by the XYZ axes drive controller 18 for controlling the servomotors, and detects the movement amounts in the X axial, Y axial, and Z axial directions by the scale unit 19b, and outputs movement pulses.

The scale unit 19b has the X axis scale portion 19bx, the Y axis scale portion 19by, and the Z axis scale portion 19bz. The detected displacement information of the tip ball 14 (the shift amount of each of the X, Y, and Z axis directions outputted from the tip ball displacement detector 11) and displacement information of each of the X, Y, and Z axe directions outputted from the scale unit 19b are outputted to a calculation unit 212, which will be described later. Note that the scale unit 19b is adjusted so as to output the reference position of the tip ball 14 at the time when there is no occurrence of a relative displacement between the scale unit 19b and the reference position of the tip ball 14.

The computer main body 21 of the computer 20 is mainly composed of, for example, a CPU, a HDD, a semiconductor memory, and the like. The computer main body 21 has a memory 211, the calculation unit 212, a display controller 213, and I/Fs (interfaces) 214 to 216. The memory 211 stores inputted information. The calculation unit 212, being composed of a CPU or the like, drives the three-dimensional measuring machine 1 and calculates a measurement value. The display controller 213 performs control of an image to be displayed on the display 24. Note that the memory 211 stores a surface shape measuring program for driving the three-dimensional measuring machine 1, detection values detected by the measurement, designed values of the object to be measured, and the like. The calculation unit 212 reads the surface shape measuring program from the memory 211 to measure the shape of the object to be measured (B).

The calculation unit 212 receives operator command information inputted from the keyboard 22 and the mouse 23 through the I/F (interface) 214. Also, the calculation unit 212 receives the detected tip ball displacement information and scale unit displacement information. The calculation unit 212 performs various types of processing including movement of the movable table 3, the column 2, and the slider 8 by the XYZ axes drive controller 18, detection of the measurement value of the object to be measured (B), correction processing of the measurement value, and the like on the basis of the inputted information, the operator command information, and the program stored in the memory 211. The calculation unit 212 outputs the measurement value calculated by the various types of processing to the printer 25 through the I/F (interface) 215. Note that, through the I/F (interface) 216, CAD data of the object to be measured (B) provided by a not shown external CAD system or the like is inputted to the computer main body 21 after conversion into a predetermined format.

Figure 7:
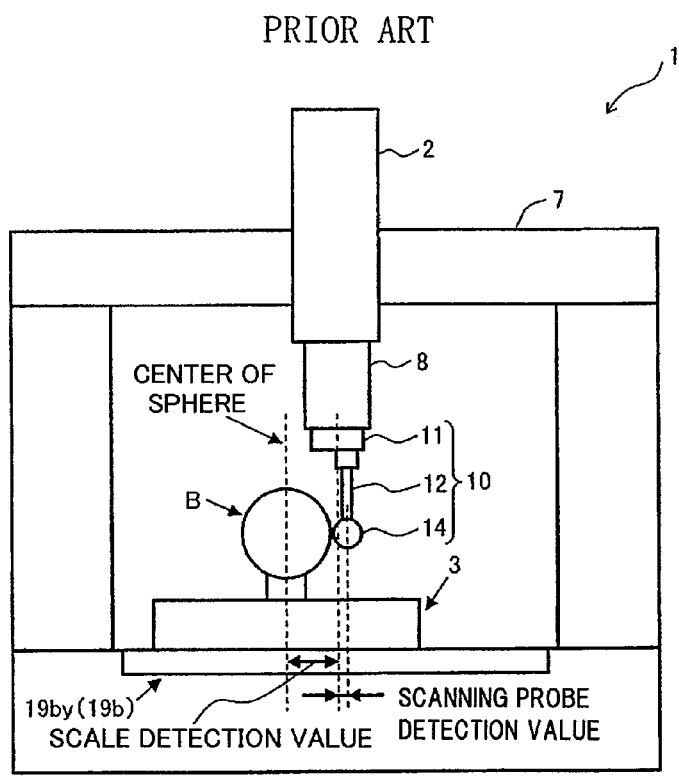
FIG. 7 is a schematic view of the scanning measurement of the sphere.
Figure 8:
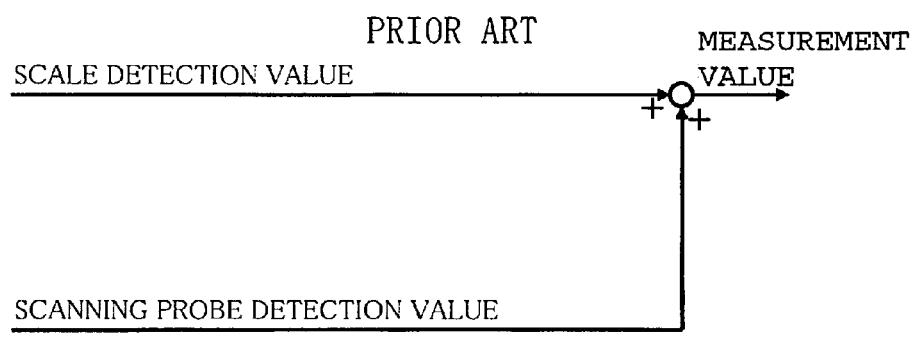
FIG. 8 is a conventional block diagram from a scale detection value and a scanning probe detection value to a measurement value.

FIG. 7 is a schematic view of scanning measurement of the sphere B by the three-dimensional (coordinate) measuring machine 1 of a table movement type provided with the scanning probe 10 of a translational movement type (according to this probe, the stylus performs translational movement upon being in contact with the object to be measured). FIG. 8 is a conventional block diagram from a scale detection value and a scanning probe detection value to the measurement value. In the scanning measurement, the scanning measurement value is obtained by addition of the scale detection value and the scanning probe detection value. Note that, the radius of the tip ball 14 of the scanning probe 10 is corrected separately.

According to designed value scanning measurement (scanning measurement based on a predetermined trajectory of motion called designed value) in general, when a movement different from a designed value occurs, this motion error is detected by both of the scale unit 19b of the three-dimensional measuring machine 1 and the tip ball displacement detector 11 of the scanning probe 10 as values having opposite signs and the same absolute value, and hence is compensated in performing of addition. Therefore, no measurement error occurs by the effect of the motion error, in general.

However, in the case of the motion error such as a quadrant projection, the effect of the quadrant projection is not compensated by the addition of the scale detection value and the scanning probe detection value, resulting in the occurrence of a measurement error. This is because the quadrant projection has a higher frequency component than the other motion errors, so that an amplitude reduction and a delay, which do not occur at a low frequency, occur in the scanning probe detection value by the effect of a frequency transfer characteristic from the tip ball 14 of the scanning probe 10 to the tip ball displacement detector 11.

Figure 9:
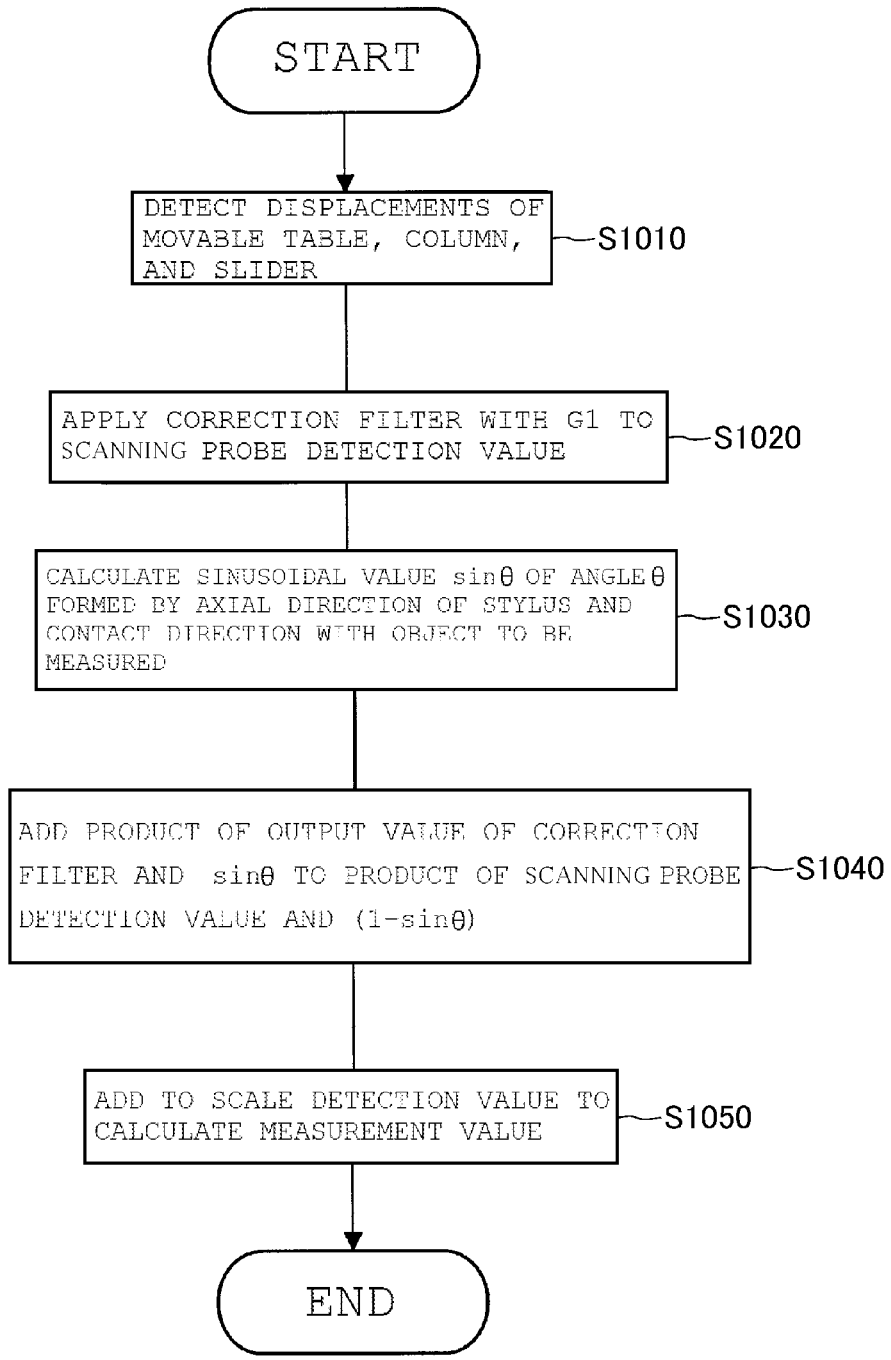
FIG. 9 is a flowchart showing a processing procedure of the embodiment according to the present invention.
Figure 10:
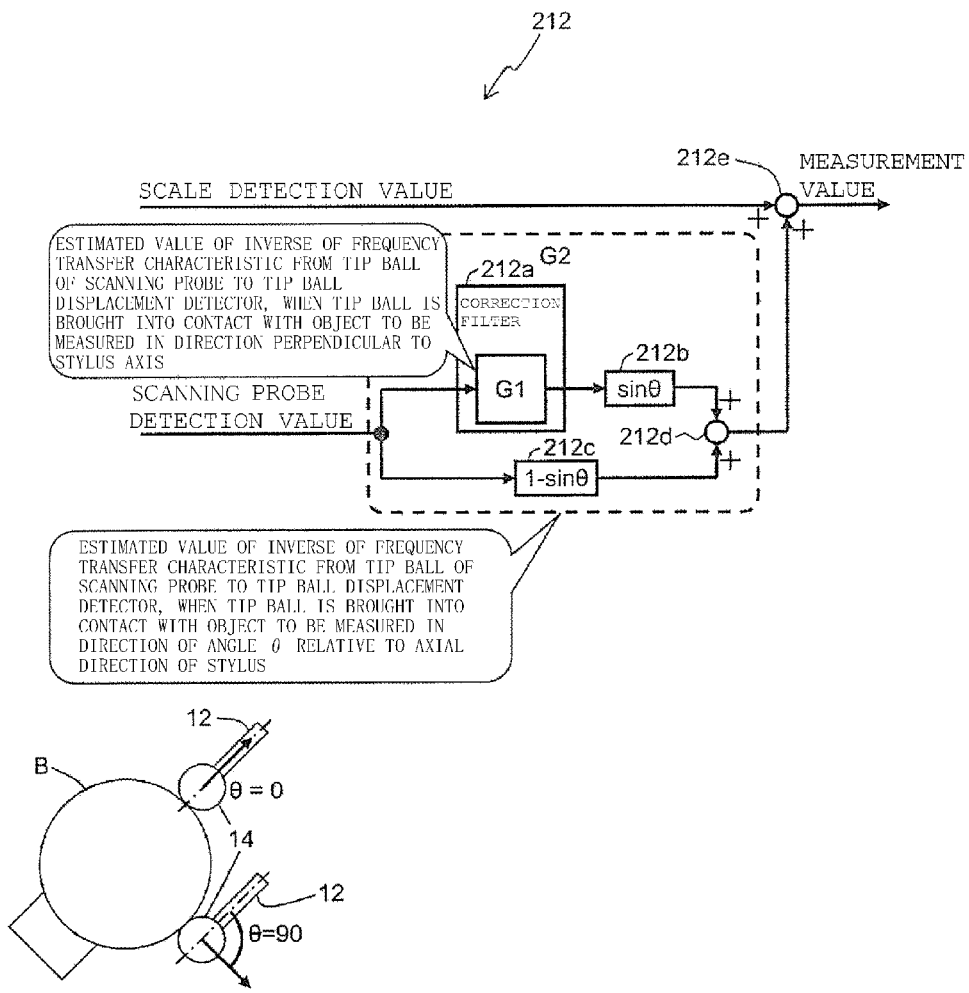
FIG. 10 is a block diagram showing the configuration of a calculation unit from a scale detection value and a scanning probe detection value to a measurement value according to the present invention.

FIG. 9 shows a processing procedure of the embodiment according to the present invention. FIG. 10 shows a block diagram of the calculation unit 212. First, the scale unit 19b detects displacements of the movable table 3, the column 2, and the slider 8 (step S1010), and inputs the displacements to the calculation unit 212. In the calculation unit 212, a correction filter 212a is applied to the scanning probe detection value (step S1020). In the correction filter 212a, an estimated value G1 of the inverse of the frequency transfer characteristic from the tip ball 14 of the scanning probe 10 to the tip ball displacement detector 11 in a state where the tip ball 14 is brought into contact with the object to be measured (B) from a direction perpendicular to an axis of the stylus 12. Then, a sinusoidal value sin θ of an angle θ that an axial direction of the stylus 12 forms with the contact direction with the object to be measured (B) is calculated (step S1030). A multiplier 212b multiplies an output value of the correction filter 212a to which G1 is set, by sin θ. A multiplier 212c multiplies the scanning probe detection value by (1−sin θ). An adder 212d adds the multiplied values (step S1040), and an adder 212e adds the added value to the scale detection value to calculate the measurement value (step S1050).

Note that the sinusoidal value sin θ of the angle θ is calculated by the following mathematical formula (1).

[Formula 1]

$$\sin\theta = \sqrt{1 - \left(\frac{\vec{a}\cdot\vec{p}}{|\vec{a}||\vec{p}|}\right)^2} \quad (1)$$

Here, $\vec{a}$: Vector showing axis direction of stylus 12
$\vec{p}$: Vector showing contact direction with object B to be measured In the formula, the vector "a" can be obtained by information on calibration of the scanning probe 10 or a probe vector (a vector from a predetermined position in the three-dimensional measuring machine 1 to the tip ball 14 of the scanning probe 10 and the length of a body of the scanning probe 10). As the vector "p," the scanning probe detection value is used.

Figure 11:
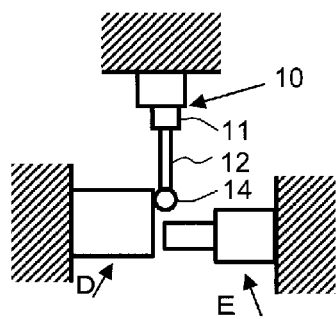
FIG. 11 is a schematic view of a G1 estimation device used in the embodiment of the present invention.

An estimation method of G1 is as follows:
A. An Estimation Method by Experiment
1. As shown in FIG. 11, the tip ball 14 of the scanning probe 10 is brought into contact with a displacement generation mechanism D formed from, for example, a PZT from a direction perpendicular to the axis of the stylus 12, and pushed by a predetermined value. Also, a displacement sensor E is disposed to measure a displacement of the displacement generation mechanism D.

2. The displacement generation mechanism D generates a displacement in a sinusoidal waveform, for example. Both of the tip ball displacement detector 11 of the scanning probe 10 and the displacement sensor E actually measure this displacement.

Figure 12:
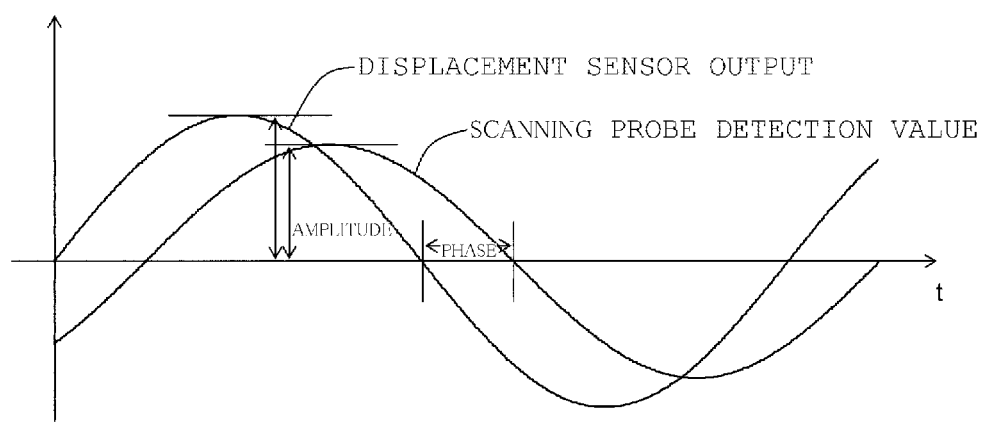
FIG. 12 is a timing chart showing an example of the relation between a displacement sensor output and the scanning probe detection value according to the present invention.

3. The amplitude and phase of an output of the displacement sensor E, with respect to the amplitude and phase of the scanning probe detection value as shown in FIG. 12, are calculated.

4. Steps 2 and 3 are repeated with changing the frequency of the displacement in the sinusoidal waveform generated by the displacement generation mechanism D, to obtain actual measurement values of the inverse of the frequency transfer characteristic from the tip ball 14 of the scanning probe 10 to the tip ball displacement detector 11.

5. G1(s) is estimated by making approximation of the actual measurement values of the inverse of the frequency transfer characteristic using a mathematical formula (2).

[Formula 2]

$$G1(s) = \frac{s^2 + 2\zeta\omega_n s + \omega_n^2}{\omega_n^2} \quad (2)$$

Figure 13A:
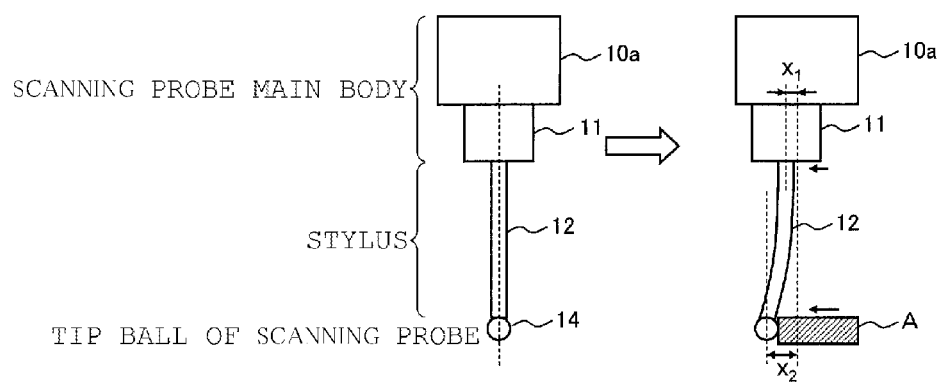
FIG. 13A is a schematic view of a scanning probe.
Figure 13B:
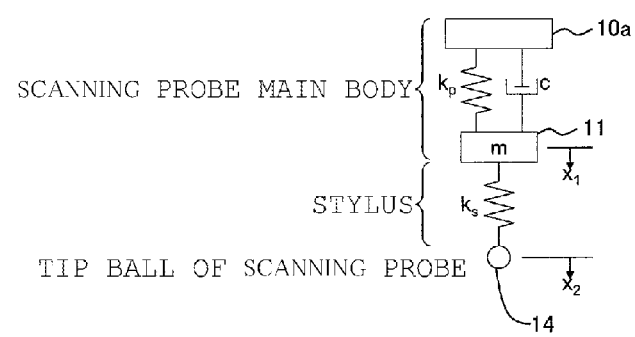
FIG. 13B is a diagram of a physical model of the scanning probe.

Here, s: the Laplace operator
$\zeta$: Damping ratio
$\omega_n$: Natural frequency B. An Estimation Method by Theory FIG. 13B is a physical model of the scanning probe in FIG. 13A. An alphanumeric character 10a refers to a probe body.

According to FIG. 13B, an equation of motion of the scanning probe 10 is represented by a mathematical formula (3).

[Formula 3]

$$m\frac{d^2 x_1}{dt^2} + c\frac{dx_1}{dt} + k_p x_1 = k_s(x_2 - x_1) \quad (3)$$

Here, $k_p$: spring constant of scanning probe 10
$k_s$: spring constant of stylus 12
c: viscosity coefficient of scanning probe 10
m: mass of moving part of scanning probe 10
$x_1$: displacement of moving part of scanning probe 10 (detected value of tip ball displacement detector 11)
$x_2$: displacement of tip ball 14 of scanning probe 10

By the Laplace transform of the mathematical formula (3), an estimated value G(s) of the inverse of the frequency transform characteristic from the tip ball 14 of the scanning probe 10 to the tip ball displacement detector 11 is represented by a mathematical formula (4). Note that, the stylus axis has sufficiently high stiffness in comparison with a mechanism of the scanning probe 10.

[Formula 4]

$$G(s) = \frac{s^2 + \frac{c}{m}s + \frac{k_s}{m}}{\frac{k_s}{m}} \quad (4)$$

To obtain an estimated value G1 of the inverse of the frequency transfer characteristic from the tip ball 14 of the scanning probe 10 to the tip ball displacement detector 11 in a state where the tip ball 14 is brought into contact with the object to be measured (B) from the direction perpendicular to the axis of the stylus 12, a spring constant $k_{90}$ in the direction perpendicular to the axis of the stylus 12 is substituted for $k_s$ in the mathematical formula (4). Thus, G1(s) is represented by a mathematical formula (5).

[Formula 5]

$$G1(s) = \frac{s^2 + \frac{c}{m}s + \frac{k_{90}}{m}}{\frac{k_{90}}{m}} \quad (5)$$

Next, a derivation process of a block diagram of FIG. 10 will be described.

Figure 14:
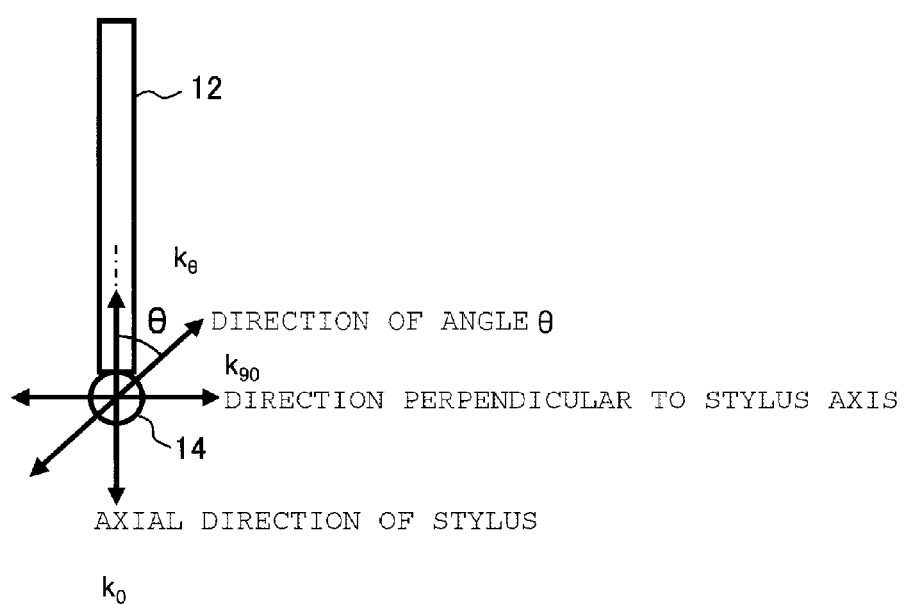
FIG. 14 is a diagram showing a spring constant of a stylus axis.

Assuming that a spring constant $k_0$ in the axial direction of the stylus 12 is sufficiently larger than $k_{90}$, a spring constant $k_\theta$ in the direction of the angle $\theta$ as shown in FIG. 14 is calculated by a mathematical formula (6).

[Formula 6]

$$k_\theta = \frac{k_{90}}{\sin\theta} \quad (6)$$

To obtain an estimated value G2 of the inverse of the frequency transfer characteristic from the tip ball 14 of the scanning probe 10 to the tip ball displacement detector 11 in the state where the tip ball 14 is brought into contact with the object to be measured (B) from the direction of the angle $\theta$ with respect to the axial direction of the stylus 12, the spring constant $k_\theta$ is substituted for $k_s$ in the mathematical formula (4). Thus, from the mathematical formulas (4) and (6), G2(s) is represented by a mathematical formula (7).

[Formula 7]

$$G2(s) = \frac{s^2 + \frac{c}{m}s + \frac{k_\theta}{m}}{\frac{k_\theta}{m}} = \frac{s^2 + \frac{c}{m}s + \frac{k_{90}}{m\sin\theta}}{\frac{k_{90}}{m\sin\theta}} \quad (7)$$

Transformation of the mathematical formula (7) brings about a mathematical formula (8).

[Formula 8]

$$G2(s) = \frac{s^2 + \frac{c}{m}s + \frac{k_{90}}{m}}{\frac{k_{90}}{m}}\sin\theta + (1 - \sin\theta) = G1(s)\cdot\sin\theta + (1 - \sin\theta) \quad (8)$$

This mathematical formula coincides with the frequency transfer characteristic from the scanning probe detection value to just prior to addition to the scale detection value in FIG. 10.

Note that, since the estimated value G1 is a second-order lead characteristic, the correction filter 212a may amplify a high frequency noise component of the scanning probe detection value. Accordingly, just as with modification examples of the calculation unit shown in FIGS. 15A and 15B, filtering processing using an additional noise removal filter 212f may be performed to eliminate the unnecessary frequency component after the scanning probe detection value is subjected to the correction filter 212a (example of FIG. 15A), or after the scanning probe detection value is added to the scale detection value (example of FIG. 15B).

Figure 16:
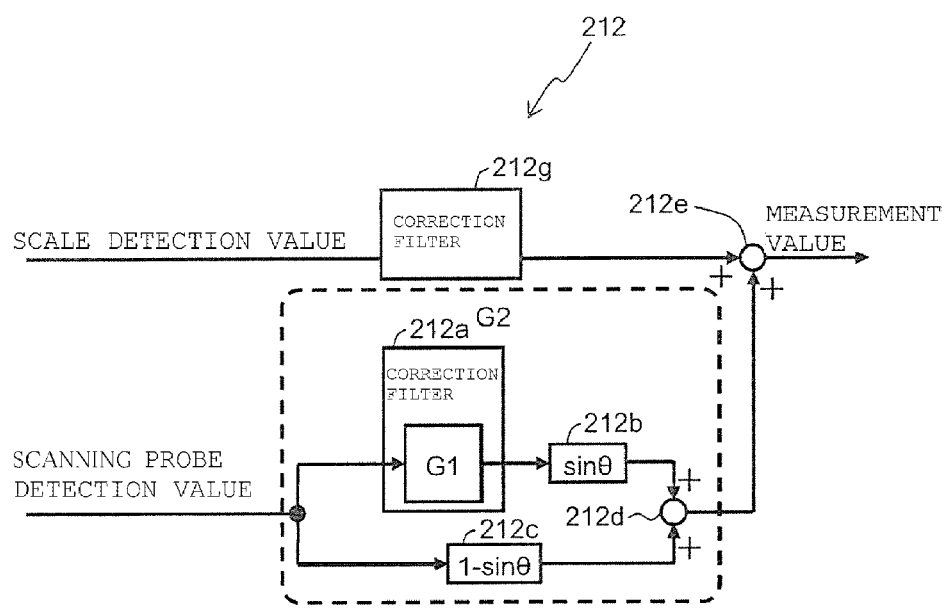
FIG. 16 is a block diagram showing another modification example of the calculation unit according to the present invention.

Also, in addition to the above embodiment, just as with another modification example shown in FIG. 16, addition of a correction filter 212g based on a frequency transfer characteristic from the scale unit of the three-dimensional measurement machine to the tip end of slider, as described in the Patent Literature 1, facilitates removal of the measurement error owing to the quadrant projection in a more appropriate manner.

Figure 15A:
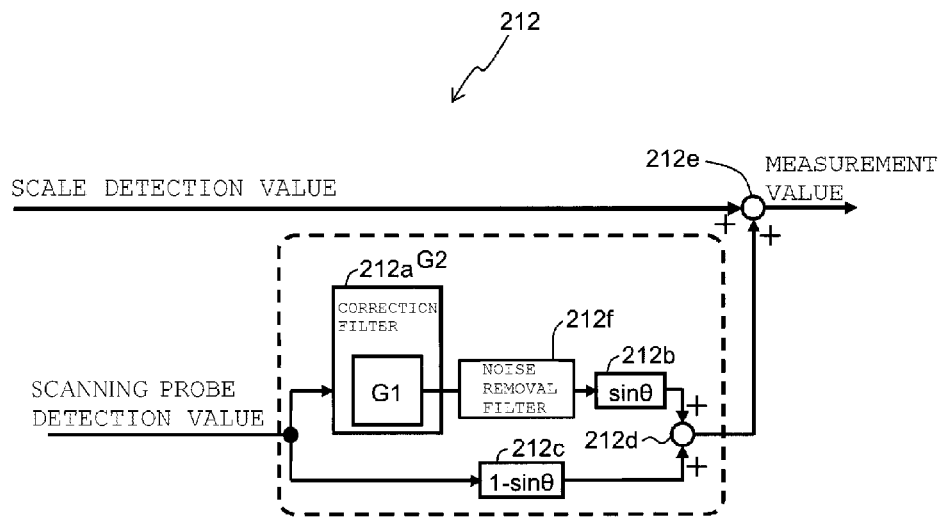
FIGS. 15A and 15B are each a block diagram showing a modification example of the calculation unit according to the present invention.
Figure 15B:
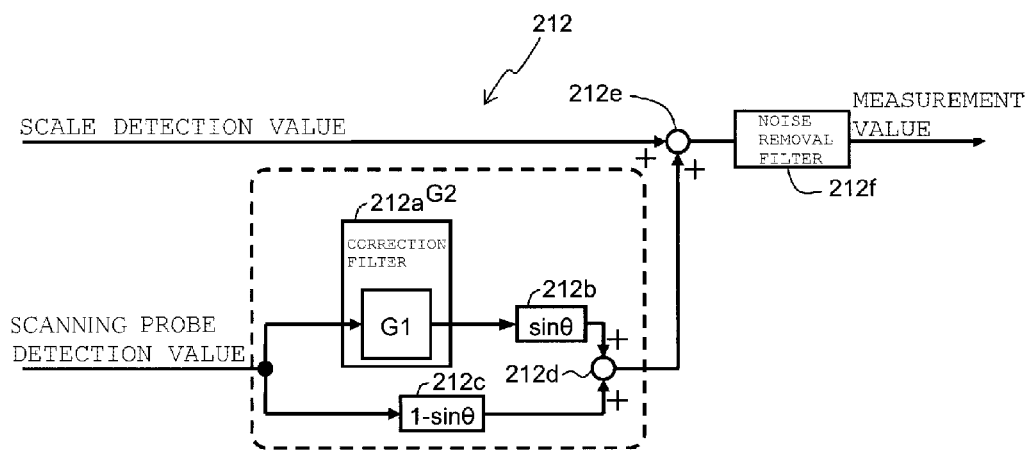

Note that, the correction filter 212g on the main body side may be added not only to the calculation unit 212 shown in FIG. 10, but also to the modification examples of the calculation unit 212 shown in FIGS. 15A and 15B.

Figure 3:
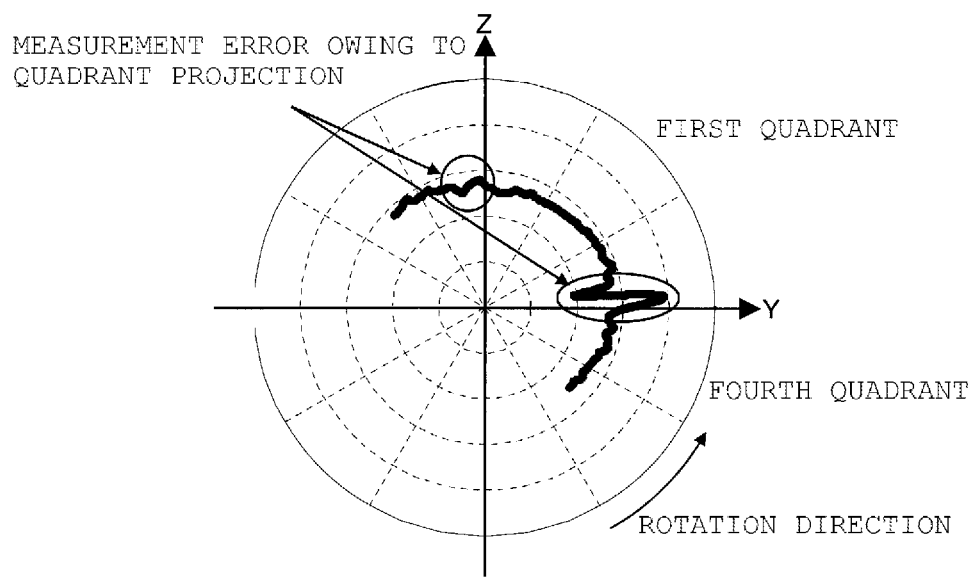
FIG. 3 is a diagram showing an example of a series of scanning measurement values of the sphere.
Figure 4:
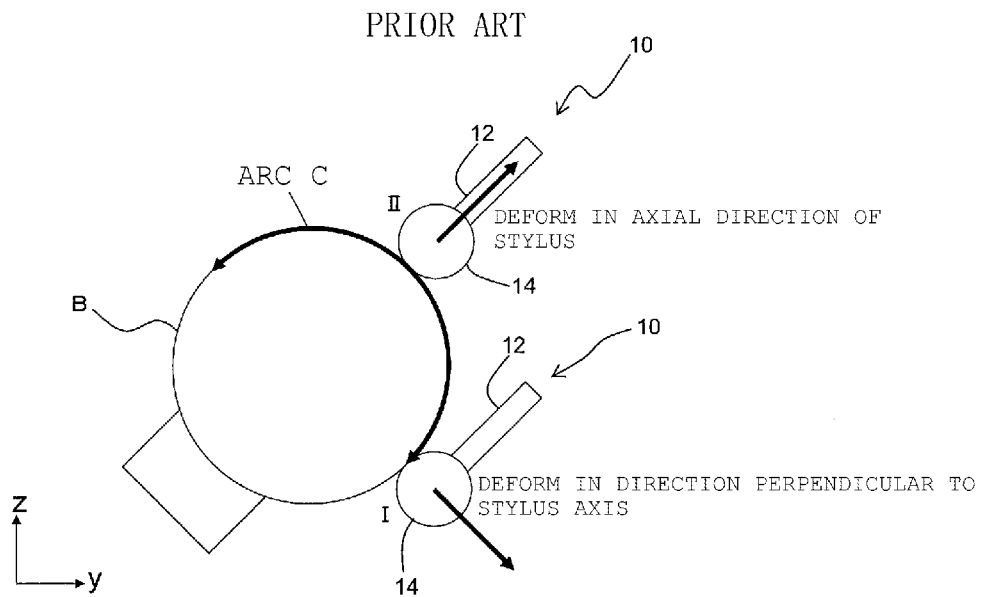
FIG. 4 is a diagram showing contact directions with an object to be measured (sphere) and the deformation of a stylus axis.
Figure 5:
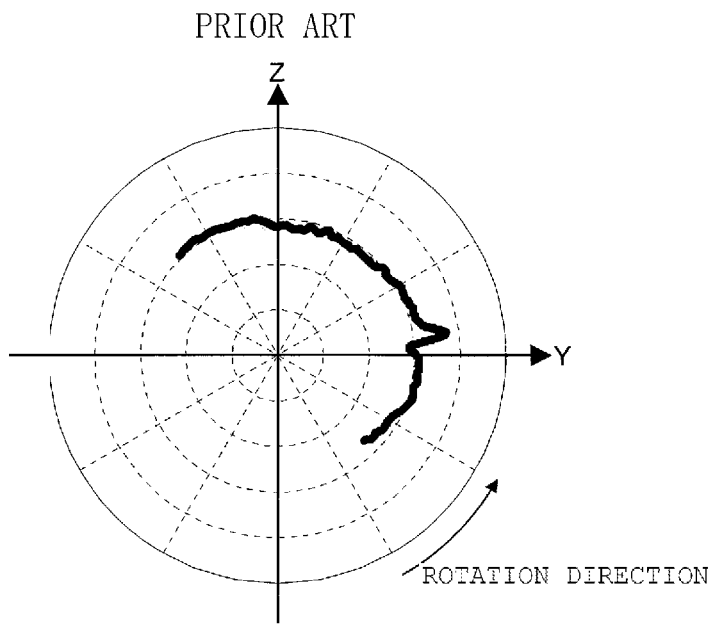
FIG. 5 is a diagram showing a simulation result in which the conventional technique is applied to the measurement value of FIG. 3.
Figure 17:
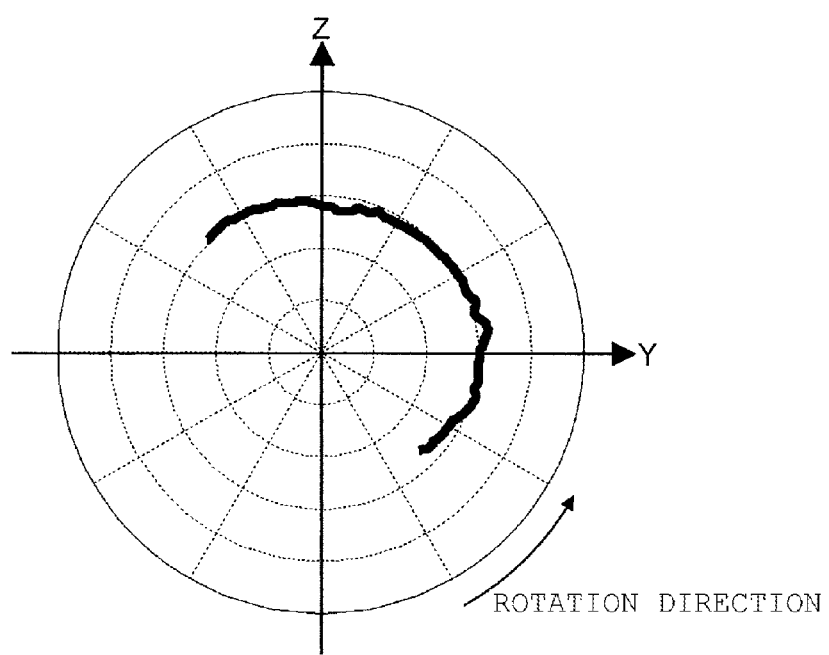
FIG. 17 is a diagram of a simulation result in which the embodiment of the present invention is applied to the measurement value of FIG. 3.

FIG. 17 shows a simulation result in which the embodiment of the present invention is applied to the scanning measurement value of the sphere shown in FIG. 3. It is confirmed from FIG. 17 that the apparatus of the present invention removed the measurement error owing to the quadrant projection.

Note that, the movable table 3 is movable just in the Y axial direction in the above embodiment, but may be movable in the X axial direction and/or the Z axial direction. In this case, the base 4 itself has a scale unit extending in the X axial direction and/or the Z axial direction.

The above embodiment describes the case of the scanning measurement of a circle, but the range of application of the present invention is not limited to this. The present invention is applicable to, for example, the scanning measurement of free curved surfaces and the like. The present invention is applicable not only to the shape measuring apparatus having a three-dimensional measuring machine, but also to a general shape measuring apparatus using a scanning probe.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A method of correcting a measurement error of a shape measuring apparatus, the shape measuring apparatus having a scanning probe for performing scanning measurement using a tip ball that is provided at an end of a stylus and is brought into contact with an object to be measured, the method comprising:
   detecting a value of displacement of the tip ball of the scanning probe by a tip ball displacement detector;
   detecting a value of displacement of a moving mechanism for relatively moving the object to be measured with respect to the scanning probe;
   calculating an angle formed by a contact direction of the tip ball with the object to be measured and an axial direction of the stylus;
   correcting, based on the angle, the detected value of displacement of the tip ball;
   outputting a corrected value of the displacement of the tip ball; and
   adding the corrected value and the detected value of displacement of the moving mechanism to determine a calculated measurement value.

2. The method of correcting a measurement error of a shape measuring apparatus according to claim 1, wherein
   the correcting of the detected value of displacement of the tip ball and the outputting of the corrected value includes:
   calculating a sinusoidal value of the angle;
   correcting the detected value of displacement of the tip ball based on an inverse of a frequency transfer characteristic from the tip ball to the tip ball displacement detector; and
   adding a product of the corrected value of the displacement of the tip ball and the sinusoidal value to a product of a subtracted value of the sinusoidal value from 1 and the detected value of displacement of the tip ball, and outputting a result of the addition as the corrected value.

3. The method of correcting a measurement error of a shape measuring apparatus according to claim 2, wherein the inverse of the frequency transfer characteristic is an estimated value.

4. The method of correcting a measurement error of a shape measuring apparatus according to claim 3, wherein the inverse of the frequency transfer characteristic is estimated by experiment.

5. The method of correcting a measurement error of a shape measuring apparatus according to claim 4, wherein
   in the detecting of the value of displacement of the tip ball, a displacement generation mechanism for displacing the tip ball and a displacement sensor for measuring a displacement provided by the displacement generation mechanism are used, so that the displacement generation mechanism is caused to generate a periodic displacement and both of the tip ball displacement detector and the displacement sensor performs measuring of the periodic displacement,
   an amplitude and a phase of an output of the displacement sensor, with respect to an amplitude and a phase of a scanning probe detection value detected by the tip ball displacement detector, are calculated, and
   processes described above are repeated while a frequency of the periodic displacement generated by the displacement generation mechanism is changed to obtain an actual measurement value of the inverse of the frequency transfer characteristic, whereby the estimated value of the frequency transfer characteristic is obtained.

6. The method of correcting a measurement error of a shape measuring apparatus according to claim 3, wherein the inverse of the frequency transfer characteristic is estimated by using a physical model of the scanning probe.

7. The method of correcting a measurement error of a shape measuring apparatus according to claim 1, further comprising performing filtering processing to remove an unnecessary frequency component from any one of the corrected value of the displacement and the calculated measurement value.

8. A shape measuring apparatus having a scanning probe for performing scanning measurement using a tip ball that is provided at an end of a stylus and is brought into contact with an object to be measured, the shape measuring apparatus comprising:
   a tip ball displacement detector configured to detect a value of displacement of the tip ball of the scanning probe;
   a scale configured to detect a value of displacement of a moving mechanism for relatively moving the object to be measured with respect to the scanning probe;

a first calculator configured to calculate an angle formed by a contact direction of the tip ball with the object to be measured and an axial direction of the stylus;
a first corrector configured to correct, based on the angle, the detected value of displacement of the tip ball and output a corrected value of the displacement of the tip ball; and
a first adder configured to add the corrected value and the detected value of displacement of the moving mechanism to determine a calculated measurement value.

9. The shape measuring apparatus according to claim 8, wherein
the first corrector includes:
a second calculator configured to calculate a sinusoidal value of the angle;
a second corrector configured to correct the detected value of displacement of the tip ball, based on an inverse of a frequency transfer characteristic from the tip ball to the tip ball displacement detector; and
a second adder configured to add a product of the corrected value of the displacement of the tip ball and the sinusoidal value to a product of a subtraction of the sinusoidal value from 1 and the detected value of displacement of the tip ball, and output a result of the addition as the corrected value.

10. The shape measuring apparatus according to claim 9, wherein the inverse of the frequency transfer characteristic is an estimated value.

11. The shape measuring apparatus according to claim 10, wherein the inverse of the frequency transfer characteristic is estimated by experiment.

12. The shape measuring apparatus according to claim 11, further comprising:
a displacement generation mechanism configured to displace the tip ball; and
a displacement sensor configured to perform measuring of a displacement provided by the displacement generation mechanism are provided,
wherein the displacement generation mechanism is caused to generate a periodic displacement and both of the tip ball displacement detector and the displacement sensor perform measuring of the periodic displacement,
an amplitude and a phase of an output of the displacement sensor, with respect to an amplitude and a phase of a scanning probe detection value detected by the tip ball displacement detector, are calculated, and
processes described above are repeated while a frequency of the periodic displacement generated by the displacement generation mechanism is changed to obtain an actual measurement value of the inverse of the frequency transfer characteristic, whereby the estimated value of the frequency transfer characteristic is obtained.

13. The shape measuring apparatus according to claim 10, wherein the inverse of the frequency transfer characteristic is estimated by using a physical model of the scanning probe.

14. The shape measuring apparatus according to claim 8, comprising a filter configured to perform a filtering process to remove an unnecessary frequency component from any one of the corrected value of the displacement and the calculated measurement value.

* * * * *